(12) United States Patent
Christofi et al.

(10) Patent No.: US 11,706,112 B1
(45) Date of Patent: Jul. 18, 2023

(54) MACHINE LEARNING (ML) OPTIMIZATION FOR 5G CONNECTED AND AUTOMATED MOBILITY (CAM) SERVICES

(71) Applicant: eBOS Technologies, Nicosia (CY)

(72) Inventors: Stelios Christofi, Nicosia (CY); Fanos Christofi, Nicosia (CY); Loizos Christofi, Nicosia (CY)

(73) Assignee: eBOS Techologies, Nicosia (CY)

( * ) Notice: Subject to any disclaimer, the term of this patent is extended or adjusted under 35 U.S.C. 154(b) by 0 days.

(21) Appl. No.: 17/990,701

(22) Filed: Nov. 20, 2022

(30) Foreign Application Priority Data

Oct. 4, 2022 (GR) .............................. 20220100816

(51) Int. Cl.
*G06F 15/177* (2006.01)
*H04L 43/08* (2022.01)
*H04L 41/16* (2022.01)

(52) U.S. Cl.
CPC .............. *H04L 43/08* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 6,947,835 B2 | 9/2005 | Kaplan | |
| 10,965,529 B2 | 3/2021 | Magzimof | |
| 11,006,282 B2 | 5/2021 | Magzimof | |
| 11,496,707 B1* | 11/2022 | Crego | G06V 20/56 |
| 2011/0039498 A1 | 2/2011 | Horton | |
| 2016/0119799 A1 | 4/2016 | Hutchins | |
| 2019/0289613 A1 | 9/2019 | Fanelli | |
| 2020/0245115 A1 | 7/2020 | Dorrance | |
| 2020/0388166 A1* | 12/2020 | Rostamzadeh | G06N 5/01 |
| 2021/0272394 A1* | 9/2021 | Cella | G06N 3/045 |
| 2022/0108604 A1* | 4/2022 | Duggal | G07C 5/0808 |
| 2023/0137578 A1* | 5/2023 | Cella | G06Q 30/0206 |
| | | | 705/28 |

* cited by examiner

*Primary Examiner* — Phuoc H Nguyen
(74) *Attorney, Agent, or Firm* — CRGO Global; Steven M. Greenberg

(57) ABSTRACT

5G connected and automated mobility (CAM) services modeling for optimization includes defining different 5G communications network configuration parameters which configure a 5G cellular communications network that encompasses a geographic region supporting autonomous vehicle movements. The method further includes assigning different values to each of the different parameters in different sets of network configurations and correlating each of the different sets with corresponding CAM performance metrics of the autonomous vehicle movements. The method yet further includes storing the correlated sets in a data structure. Finally, the method includes querying the data structure with a new set of values for the parameters and receiving in response to the querying, correlated ones of the corresponding CAM performance metrics.

15 Claims, 3 Drawing Sheets

MACHINE LEARNING (ML) OPTIMIZATION FOR 5G CONNECTED AND AUTOMATED MOBILITY (CAM) SERVICES

CROSS-REFERENCE TO RELATED APPLICATIONS

This application claims priority under 35 U.S.C. § 119(a) to Greek patent application 20220100816 filed on Oct. 4, 2022, the entire teachings of which are incorporated herein by reference.

BACKGROUND OF THE INVENTION

Field of the Invention

The present invention relates to the technical field of 5G services delivery modeling and more particularly to the modeling of the delivery of 5G CAM services.

Description of the Related Art

Fifth-generation wireless (5G) is the latest iteration of cellular technology, designed to greatly increase the speed and responsiveness of wireless networks. Data transmitted over 5G supported broadband connections travel at multi-gigabit speeds which in many instances, surpass the speed achievable in a wireline network, all the while offering data transmission latencies below five milliseconds. As such, the 5G communications network can support computing applications requiring real-time coordination. Given the potential of 5G cellular communications, it is expected that a multiplicity of heretofore unachievable real time applications will be attempted, and will co-exist on the same fabric of a 5G deployment-particularly given the ability of 5G to support a significantly greater amount of transmitted data than its predecessor owing to more available bandwidth and advanced antenna technology.

CAM services have emerged as an important class of technology ably supported by the 5G wireless cellular communications platform. CAM services generally refer to applications which support the coordinated activity of different end points sharing a same context. That context can range from the orchestration of movement of different independently moving objects within a defined geographical space, to the orchestration of information transmitted amongst moving objects within a defined geographical space. Autonomous vehicle group coordination represents one notorious example of CAM services which includes elements such as dynamic mapping and accurate positioning. Other examples include cooperative sensing of travel route conditions, awareness driving for individual vehicles traversing a roadway, uninterrupted infotainment delivery to individual vehicles traversing a roadway, and multimodal logistics utilizing road, rail, air and sea. While all share common infrastructure requirements of the 5G network, the specific performance needs of each vary with some aspects of the 5G network being more important than other aspects depending upon the use case.

As can be seen, the ability of a 5G network to efficiently deliver the foregoing CAM services depends in large part upon the manner in which the 5G network has been configured. Small differences in the configuration of a 5G network, while optimal in one use case, can be sub-optimal in other use cases. Modeling the impact of these differences, especially the impact on the performance of the ultimate use case-the orchestration of autonomous vehicles in a shared geographic region-is a matter of manual observation and iterative experimentation. Indeed, modeling the impact of a configuration set of a 5G network supporting multiple different use cases can be too manually intensive to be realistic.

BRIEF SUMMARY OF THE INVENTION

Embodiments of the present invention address technical deficiencies of the art in respect to optimizing the delivery of CAM services to a geographic region supporting autonomous vehicle movements. To that end, embodiments of the present invention provide for a novel and non-obvious method for 5G CAM services modeling for optimization. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for 5G CAM services modeling for optimization includes defining different 5G communications network configuration parameters which configure a 5G cellular communications network that encompasses a geographic region supporting autonomous vehicle movements. The method further includes assigning different values to each of the different parameters in different sets of network configurations and correlating each of the different sets with corresponding CAM performance metrics of the autonomous vehicle movements. The method yet further includes storing the correlated sets in a data structure. Finally, the method includes querying the data structure with a new set of values for the parameters and receiving in response to the querying, correlated ones of the corresponding CAM performance metrics.

In one aspect of the embodiment, the data structure is a deep neural network trained with the different sets of the network configurations and the correlated corresponding CAM performance metrics for each one of the different sets annotating the one of the different sets as ground truth in the deep neural network. In another aspect of the embodiment, the CAM performance metrics include minimum separation distance between vehicles traversing the geographic region, or a maximum number of the vehicles present in the geographic region. In yet another aspect of the embodiment, the correlated corresponding CAM performance metrics are computed from sensor data received wirelessly in the 5G cellular communications network from the different vehicles as the different vehicles traverse the geographic region.

In another embodiment of the invention, a data processing system is adapted for 5G CAM services modeling in a 5G cellular communications network, for the optimization of performance metrics of the movement of autonomous vehicles within a geographic region services by the 5G cellular communications network. The system includes a host computing platform having one or more computers, each with memory and one or processing units including one or more processing cores. The system also includes a CAM services optimization module. The method includes computer program instructions enabled while executing in the memory of at least one of the processing units of the host computing platform to define different 5G communications network configuration parameters configuring the 5G cellular communications network, to assign different values to each of the different parameters in different sets of network configurations and correlate each of the different sets with corresponding CAM performance metrics of the autonomous vehicle movements, to store the correlated sets in a data structure and to query the data structure with a new set of values for the parameters and to receive in response to the querying, correlated ones of the corresponding CAM performance metrics.

In this way, the technical deficiencies of the modeling of the impact of different 5G communications network parameters upon CAM services performance metrics are overcome owing to machine learning prediction of CAM services performance responsive to a prospective configuration of a supporting 5G cellular communications network without requiring a manually intensive iterative process of guesswork. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for 5G CAM services modeling for optimization. In accordance with an embodiment of the invention, performance metrics for the delivery of CAM services are measured as different vehicles traverse a geographic region supported by an associated 5G cellular communications network configured differently at different times according to different 5G cellular communications network parameters. A predicting data structure records a correlation between the different configuration parameters of the 5G cellular communications network and the resulting measured performance metrics for each of the different CAM services. Thereafter, the predicting data structure receives a proposed new set of configuration parameters for the 5G cellular communications network and returns predicted CAM performance metrics for the new set of configuration parameters with respect to a corresponding one of the CMA services without requiring one to engage in iterative guesswork.

Figure 1:
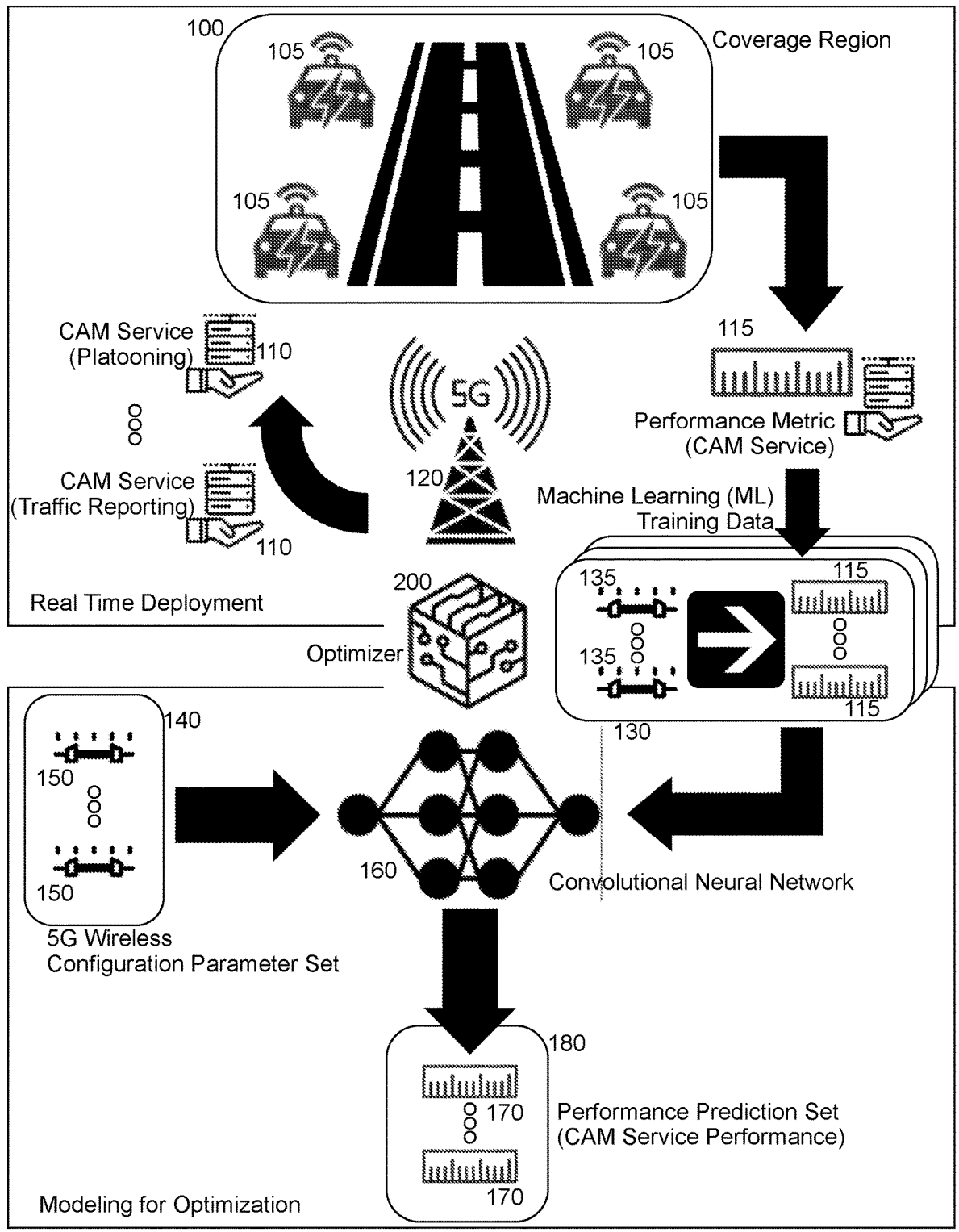
FIG. 1 is a pictorial illustration reflecting different aspects of a process of 5G CAM services modeling for optimization.

In illustration of one aspect of the embodiment, FIG. 1 pictorially shows a process of 5G CAM services modeling for optimization. As shown in FIG. 1, different CAM services 110 are provided by 5G wireless cellular communications system 120 to different vehicles 105 traversing a route within a geographic region 100. Those CAM services 110 can include autonomous vehicle group coordination, cooperative sensing of travel route conditions, awareness driving for individual vehicles traversing a roadway, uninterrupted infotainment delivery to individual vehicles traversing a roadway, and multimodal logistics utilizing road, rail, air and sea. More specific instances of CAM services 110 include vehicle platooning, coordinate vehicle lane changing, vehicle entrance and egress management onto a roadway, and the like.

An optimizer 200 receives from the over the 5G wireless cellular communications system 120, raw data from each of the vehicles 105 including position and speed information so that the optimizer 200 computes performance metrics 115 for each of the CAM services 110. Those performance metrics 115 can include, for example, vehicle spacing metrics amongst the vehicles 105 in the geographic region 100, vehicle density metrics accounting for a number of the vehicles 105 accommodated within the geographic region 100 over a measured interval of time, traffic development prediction timing for the geographic region 110 indicating a period of time in advance of the development of traffic conditions at which moment the traffic conditions are predicted, and a quantity of delivered streaming data to the vehicles 105 in the region over a measured interval of time.

The optimizer 200 then correlates in a computing artifact 130 such as a document, the configuration parameters 135 for the 5G wireless cellular communications system 120 at the time of the receipt of the computed performance metrics 115 with the computed performance metrics 115. The optimizer 200 then provides the computing artifact 130 as training input to a predicting data structure 160 such as a convolutional neural network so that the configuration parameters 135 are associated with the "ground truth" of the computed performance metrics 115. As such, after the receipt of a number of instances of the training document 130, the predicting data structure 160 will have been trained to return a prediction 180, with some confidence, of the performance metrics 170 expected in light of a hypothetical set 140 of configuration parameters 150 for the 5G wireless cellular communications system 120.

Figure 2:
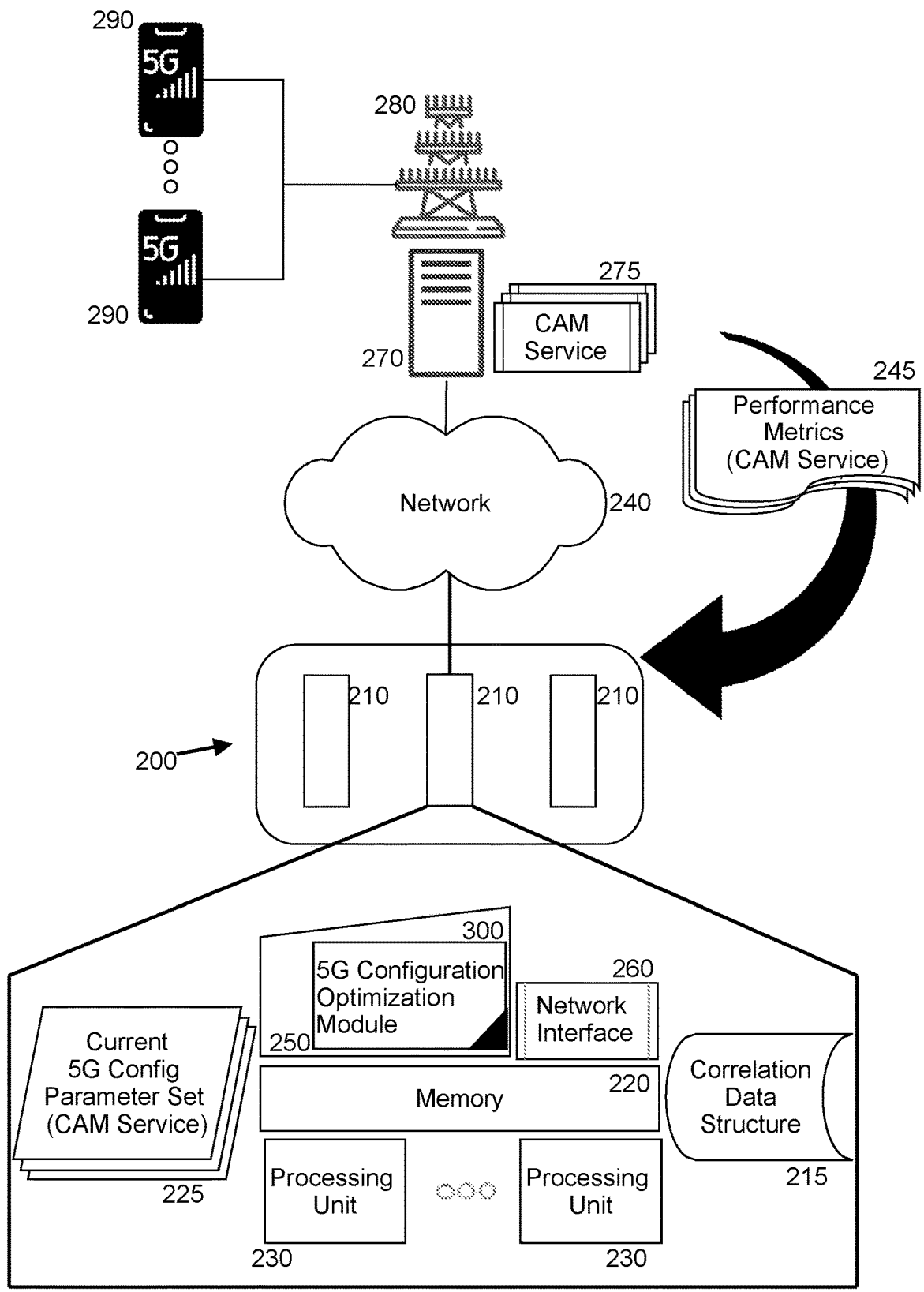
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform 5G CAM services modeling for optimization. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

The host computing platform 200 is communicatively coupled to a 5G wireless cellular communications system 280 over the data communications network 240. The 5G wireless cellular communications system 280 provides 5G wireless cellular communications to different user equipment (UE) 290 (associated with different vehicles). The 5G wireless cellular communications system 280 further delivers programmatic CAM services 275 to the UE 290 as managed within remote computing device 270 operating in connection with the 5G wireless cellular communications system 280. As such, the remote computing device 270 collects real time positioning and movement data from the UE 290 and computes CAM service performance metrics 245 for the different CAM services 275 which in turn are communicatively transmitted to the host computing platform 200 over the data communications network 240.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for 5G CAM services modeling for optimization. Specifically, the program instructions during execution train a predicting correlation data structure 215 to correlate different sets of configuration parameters 225 for the 5G wireless cellular communications system 280 with the CAM services performance metrics 245 determined for the 5G wireless cellular communications system 280 whilst the 5G wireless cellular communications system 280 is configured according to the configuration parameters 225.

As such, the program instructions may then receive a hypothetical set of the configuration parameters for the 5G wireless cellular communications system 280 in respect to one or more of the CAM services 275. In response, the program instructions query the correlation data structure 215 with the hypothetical set of the configuration parameters for the 5G wireless cellular communications system 280. Thereafter, the program instructions receive from the correlation data structure 215 a predicted set of performance metrics for the one or more of the CAM services 275.

Figure 3:
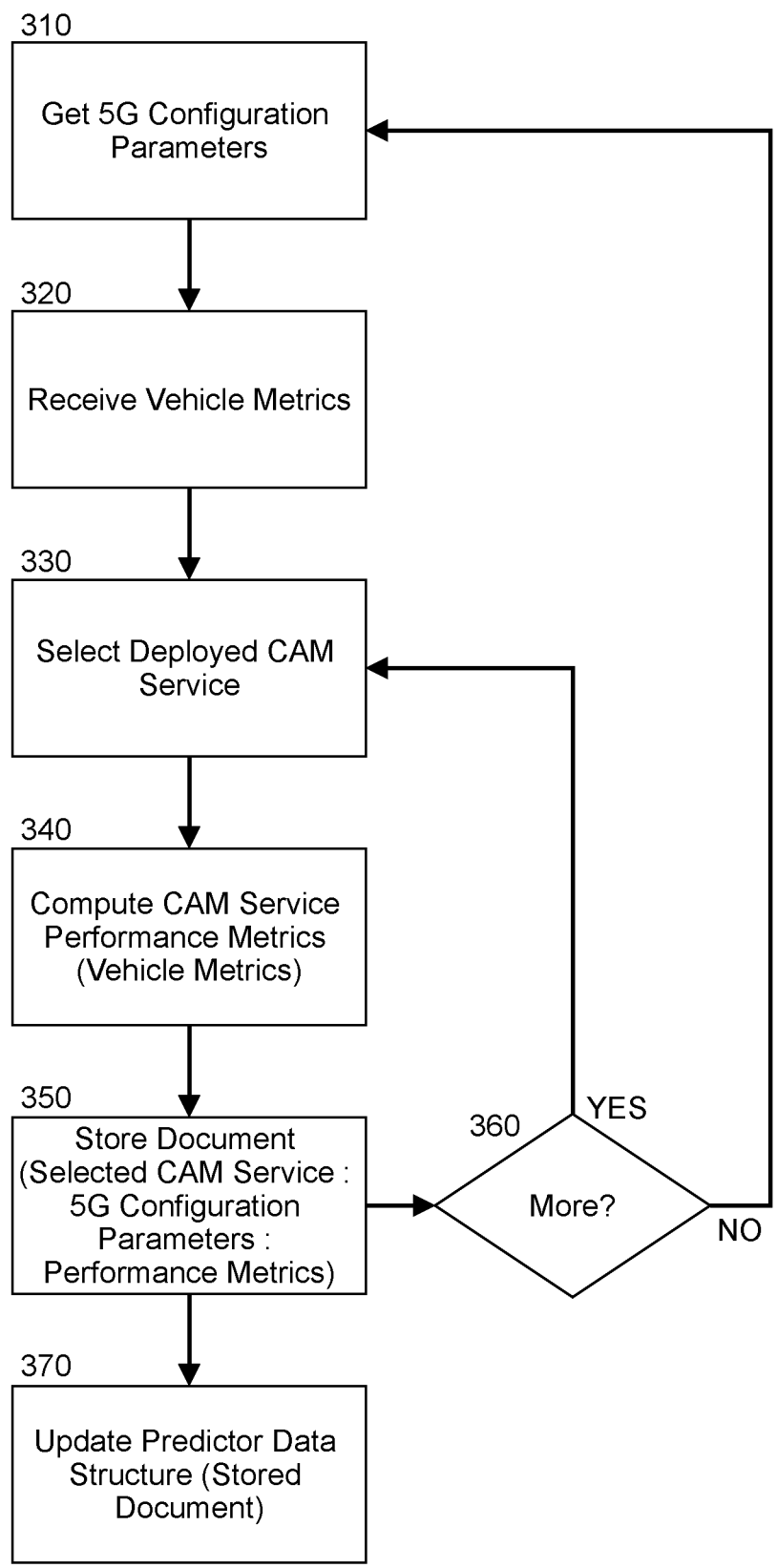

In further illustration of an exemplary operation of the module in respect to the training of the correlation data structure 215, FIG. 3 is a flow chart illustrating a process for training the correlation data structure. Beginning in block 305, a set of configuration parameters for the 5G wireless cellular communications system is received. Then, during operation of the 5G wireless cellular communications system, different vehicle metrics are received, for instance position and speed. In block 330, a particular one of the deployed CAM services in the 5G wireless cellular communications system is selected for association with the vehicle metrics and in block 340, one or more performance metrics for the particular one of the deployed CAM services is computed, such as vehicle spacing or vehicle density or average vehicle speed, or vehicle throughput, to name a few examples.

In block 350, the computed performance metrics for the particular one of the deployed CAM services are stored in a computing artifact in connection with the 5G configuration parameters and the particular one of the deployed CAM services. Subsequently, in decision block 360, it is determined if further CAM services deployed in the 5G wireless cellular communications system remain to be processed. If so, the process returns to block 330. Otherwise, the process repeats for a new set of 5G configuration parameters in block 310. Regardless however, periodically, the stored documents are then used to update the predictor data structure as input configuration parameters annotated with the ground truth of the referenced CAM services performance metrics. In this way, the predictor data structure is continuously updated with observed performance metrics in correlation to the configuration of the 5G wireless cellular communications system.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for 5G connected and automated mobility (CAM) services modeling for optimization comprising:
    defining different 5G communications network configuration parameters configuring a 5G cellular communications network encompassing a geographic region supporting vehicle movements;
    assigning different values to each of the different parameters in different sets of network configurations and correlating each of the different sets with corresponding CAM performance metrics of the vehicle movements;
    storing the correlated sets in a data structure; and,
    querying the data structure with a new set of values for the parameters and receiving in response to the querying, correlated ones of the corresponding CAM performance metrics.

2. The method of claim 1, wherein the data structure is a deep neural network trained with the different sets of the network configurations and the correlated corresponding CAM performance metrics for each one of the different sets annotating the one of the different sets as ground truth in the deep neural network.

3. The method of claim 1, wherein the CAM performance metrics include minimum separation distance between vehicles traversing the geographic region.

4. The method of claim 1, wherein the CAM performance metrics include a maximum number of the vehicles present in the geographic region.

5. The method of claim 1, wherein the correlated corresponding CAM performance metrics are computed from sensor data received wirelessly in the 5G cellular communications network from the different vehicles as the different vehicles traverse the geographic region.

6. A data processing system adapted for 5G connected and automated mobility (CAM) services modeling for optimization, the system comprising:
    a host computing platform comprising one or more computers, each with memory and one or processing units including one or more processing cores; and,
    a CAM services optimization module comprising computer program instructions enabled while executing in the memory of at least one of the processing units of the host computing platform to perform:
        defining different 5G communications network configuration parameters configuring a 5G cellular communications network encompassing a geographic region supporting vehicle movements;
        assigning different values to each of the different parameters in different sets of network configurations and correlating each of the different sets with corresponding CAM performance metrics of the vehicle movements;
        storing the correlated sets in a data structure; and,
        querying the data structure with a new set of values for the parameters and receiving in response to the querying, correlated ones of the corresponding CAM performance metrics.

7. The system of claim 6, wherein the data structure is a deep neural network trained with the different sets of the network configurations and the correlated corresponding CAM performance metrics for each one of the different sets annotating the one of the different sets as ground truth in the deep neural network.

8. The system of claim 6, wherein the CAM performance metrics include minimum separation distance between vehicles traversing the geographic region.

9. The system of claim 6, wherein the CAM performance metrics include a maximum number of the vehicles present in the geographic region.

10. The system of claim 6, wherein the correlated corresponding CAM performance metrics are computed from sensor data received wirelessly in the 5G cellular communications network from the different vehicles as the different vehicles traverse the geographic region.

11. A computing device comprising a non-transitory computer readable storage medium having program instructions stored therein, the instructions being executable by at least one processing core of a processing unit to cause the processing unit to perform 5G connected and automated mobility (CAM) services modeling for optimization, including:
    defining different 5G communications network configuration parameters configuring a 5G cellular communications network encompassing a geographic region supporting vehicle movements;
    assigning different values to each of the different parameters in different sets of network configurations and correlating each of the different sets with corresponding CAM performance metrics of the vehicle movements;
    storing the correlated sets in a data structure; and,
    querying the data structure with a new set of values for the parameters and receiving in response to the querying, correlated ones of the corresponding CAM performance metrics.

12. The device of claim 11, wherein the data structure is a deep neural network trained with the different sets of the network configurations and the correlated corresponding CAM performance metrics for each one of the different sets annotating the one of the different sets as ground truth in the deep neural network.

13. The device of claim 11, wherein the CAM performance metrics include minimum separation distance between vehicles traversing the geographic region.

14. The device of claim 11, wherein the CAM performance metrics include a maximum number of the vehicles present in the geographic region.

15. The device of claim 11, wherein the correlated corresponding CAM performance metrics are computed from sensor data received wirelessly in the 5G cellular communications network from the different vehicles as the different vehicles traverse the geographic region.

* * * * *